United States Patent
Reeves

(10) Patent No.: US 12,143,821 B2
(45) Date of Patent: Nov. 12, 2024

(54) FRAUD DETECTION IN WIRELESS COMMUNICATION NETWORKS

(71) Applicant: T-Mobile Innovations LLC, Overland Park, KS (US)

(72) Inventor: Raymond Emilio Reeves, Orlando, FL (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 382 days.

(21) Appl. No.: 17/661,679

(22) Filed: May 2, 2022

(65) Prior Publication Data

US 2023/0354033 A1 Nov. 2, 2023

(51) Int. Cl.
*H04W 12/122* (2021.01)
*H04B 17/318* (2015.01)
*H04W 12/64* (2021.01)
*H04W 24/10* (2009.01)

(52) U.S. Cl.
CPC ........ *H04W 12/122* (2021.01); *H04B 17/318* (2015.01); *H04W 12/64* (2021.01); *H04W 24/10* (2013.01)

(58) Field of Classification Search
CPC ... H04W 12/122; H04W 12/64; H04W 24/10; H04B 17/318
See application file for complete search history.

(56) References Cited

U.S. PATENT DOCUMENTS

| | | | | |
|---|---|---|---|---|
| 9,872,237 B1* | 1/2018 | Wang | | H04W 48/06 |
| 10,699,545 B1* | 6/2020 | Chan | | G06F 18/295 |
| 2012/0309431 A1* | 12/2012 | Bodog | | H04W 16/18 |
| | | | | 455/456.6 |
| 2021/0014689 A1* | 1/2021 | Wang | | H04W 76/30 |
| 2021/0329585 A1* | 10/2021 | Mamlet | | H04B 17/318 |
| 2023/0007488 A1* | 1/2023 | Mallya | | H04W 4/023 |
| 2023/0142626 A1* | 5/2023 | Balasubramanian | | |
| | | | | G01S 13/765 |
| | | | | 455/456.1 |
| 2023/0262416 A1* | 8/2023 | Edge | | H04W 12/12 |
| | | | | 455/456.1 |
| 2023/0354033 A1* | 11/2023 | Reeves | | H04W 24/10 |
| 2023/0403532 A1* | 12/2023 | Reeves | | H04L 43/10 |
| 2024/0187864 A1* | 6/2024 | Duan | | H04W 12/122 |

FOREIGN PATENT DOCUMENTS

| WO | WO-2012136245 A1 * | 10/2012 | ............ H04W 12/02 |
|---|---|---|---|
| WO | WO-2022081125 A1 * | 4/2022 | ............ G01S 5/021 |

* cited by examiner

*Primary Examiner* — Michael J Moore, Jr.
(74) *Attorney, Agent, or Firm* — Shook, Hardy & Bacon L.L.P.; Elena McFarland

(57) ABSTRACT

Detecting and remediating fraud on a wireless communications network is described. Trace reports corresponding to nodes and user equipment may be received. Two or more user equipment and associated with a common user may be indicative of fraud. Two or more user equipment may be instructed to identify their precise location, such as via a minimization of drive-testing system of the node and/or UE. Upon receiving a first precise location associated with a first user equipment and a second precise location associated with a second user equipment, and accessing a historical record of the common user, a comparison may be performed. Based upon this, one or more user equipment may be identified as fraudulent. Various remedial actions may be instructed related to at least one of the first node or the first user equipment.

20 Claims, 6 Drawing Sheets

FRAUD DETECTION IN WIRELESS COMMUNICATION NETWORKS

SUMMARY

The present disclosure is directed, in part, to the identification of fraudulent electronic devices on a wireless communication network. The present disclosure utilizes specific hardware and software to improve existing fraud systems for wireless communications networks. When two or more electronic devices purporting to be the same user are identified on the network, these electronic devices will be instructed to enable a precise location system. The precise location system will provide a precise location and/or other additional information as to the location of each electronic device. The precise location will then be compared to prior instances of the legitimate user. Based upon the comparison, one or more electronic devices may be identified as fraudulent or potentially fraudulent. These electronic devices may be disabled or removed from the network.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
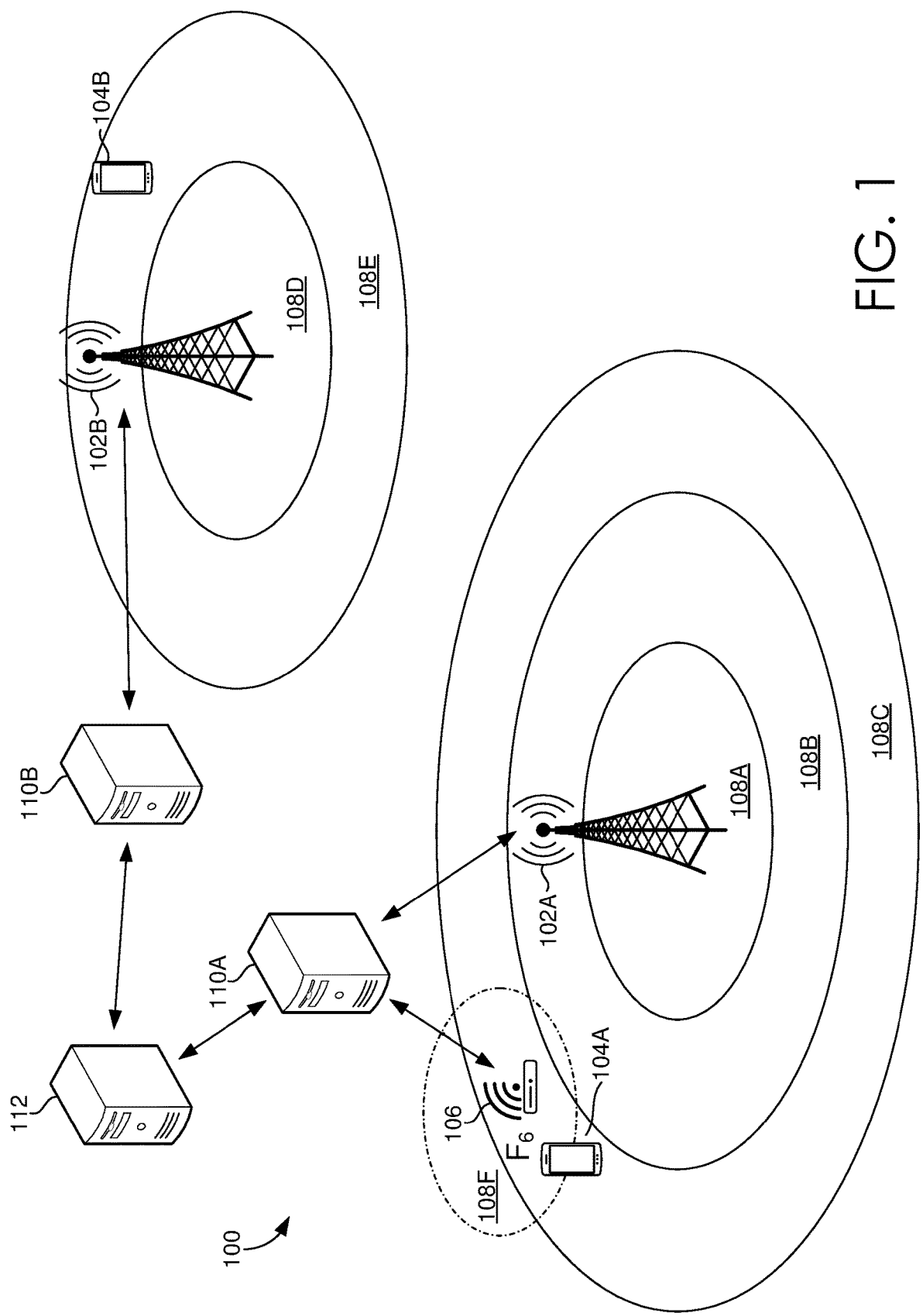
FIG. 1 is a diagram of a wireless communications network in which one or more aspects of the present disclosure may be carried out.

The subject matter of aspects herein is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Various technical terms are used throughout this description. An illustrative resource that fleshes out various aspects of these terms can be found in Newton's Telecom Dictionary, 31st Edition (2018).

Embodiments of the current disclosure may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more base stations to provide wireless access to a network. For example, in a wireless telecommunication network, a plurality of access points, each providing service for a cell or a sector of a cell, are used to transmit and receive wireless signals to/from one or more UEs. An access point may be considered to be one or more otherwise-discrete components comprising an antenna, a radio, and/or a controller, and may be alternatively referred to as a "node," in that it is a point of origin for the communication link between the wired and wireless portions of the communication system. In aspects, a node may be defined by its ability to communicate with a UE according to a single protocol (e.g., 3G, 4G, LTE, 5G, and the like); however, in other aspects, a single node may communicate with a UE according to multiple protocols.

As used herein, the terms "cell" or "node" may be specific nodes, base stations, or access points that can be considered to be discrete from one another. While cells and nodes may be referred to herein with respect to its protocol, it should be understood that any particular cell or node may be capable of operating in any one or more of any suitable wireless communication protocol, using any one or more frequencies, frequency bands, channels, and the like. The terms "user device," "user equipment," "UE," "mobile device," "mobile handset," and "mobile transmitting element" may be used interchangeably in this description.

Accordingly, a first aspect of the present disclosure is directed to a computerized method for detecting and remediating fraud. The method includes receiving a first trace report corresponding to a first user equipment and a first node, and receiving a second trace report corresponding to a second user equipment and a second node. Both the first user equipment and the second user equipment are associated with a common user. The method also includes instructing each of the first user equipment and the second user equipment to identify their precise location, such as via a minimization of drive-testing system of the node and/or UE. Upon receiving a first precise location associated with the first user equipment and a second precise location associated with the second user equipment, and accessing a historical record of the common user, the method includes comparing the first precise location and the second precise location to the historical record. Based upon this, the method includes determining that the first user equipment is fraudulent. The method further includes instructing a remedial action related to at least one of the first node or the first user equipment.

A second aspect of the present disclosure is directed to a system that includes a processor and a non-transitory computer readable storage medium. The computer readable storage medium has a computer program thereon that, when executed by the processor performs a method. The method includes receiving a first trace report corresponding to a first user equipment and a first node, and receiving a second trace report corresponding to a second user equipment and a second node. Both the first user equipment and the second user equipment are associated with a common user. The method also includes instructing each of the first user equipment and the second user equipment to identify their precise location. Upon receiving a first precise location associated with the first user equipment and a second precise location associated with the second user equipment, and accessing a historical record of the common user, the method includes comparing the first precise location and the second precise location to the historical record. Based upon this, the method includes determining that the first user equipment is fraudulent. The method further includes instructing a remedial action related to at least one of the first node or the first user equipment.

A third aspect of the present disclosure is directed to a system comprising an trace processor and a fraud analyzer. The trace processor is configured to receive a trace report from a first node indicative of a first user equipment, geo-locate the first user equipment based at least in part on the trace report, and generate a first geo-located trace report. The fraud analyzer is configured to receive, from trace processor, the geo-located trace report corresponding to the first user equipment, and receive a second geo-located trace report corresponding to a second user equipment. Both the first user equipment and the second user equipment are associated with a common user. Based upon this, the fraud analyzer will instruct each of the first user equipment and the second user equipment to identify their precise location. Upon receiving a first precise location associated with the first user equipment and a second precise location associated with the second user equipment, and upon accessing a historical record of the common user, the fraud analyzer will compare the first precise location and the second precise location to the historical record. Based upon the comparison, the fraud analyzer will determine that the first user equipment is fraudulent and instruct a remedial action related to at least one of the first node or the first user equipment.

In various embodiments, the present disclosure discusses the detection and removal of fraudulent electronic devices from a communications network. As an example, a fraudulent cell phone (e.g., a UE) on a wireless broadband network may be used to fraudulently authenticate financial data. In this scenario, the fraudulent UE may be used to receive two-factor authentication messages, which can then be fraudulently confirmed. This allows the scammer to proceed with other fraudulent activities based upon the financial data. In some instance, the fraud may include changing or accepting the access code. This can fake the two-factor authentication. The scammer can thus use the UE to emulate a victim's UE so that the scammer can successfully pass the two-factor authentication that would otherwise prevent the scam. In other example scams, the scammer may gain access to various premium content, like streaming services or SMS. In still other exemplary scams, the fraudulent UE may clone a user device such that all foreign/long-distance charges are billed to the account owner.

Embodiments of the present disclosure detect fraud in real time to prevent further fraud from being committed. The fraud detection is performed by various network components to which the fraudulent UE is connected. The fraud detection may be used in combination with other types of fraud detection at the UE, the node, the core network, the authenticating party (for the two-factor authentication example), or other location/device.

The fraud is detected, at least in part, by centralizing trace reports so that they can be analyzed for potential duplicate UEs. The trace reports may include a connection strength to one or more nodes. Based upon this, an estimated location for the UE may be determined. Embodiments of the invention may instruct the UE to determine a more precise location for the UE. The more precise location may be determined from a minimization of drive testing (MDT) system or other precise location system. This will assist in determining which of the UEs is fraudulent.

According to another aspect of the technology described herein, a system may include a base station and a user device in communication with the base station. The base station and the user device may each perform one or more of the steps described herein. According to yet another aspect of the technology described herein, a non-transitory computer readable storage medium having a computer program stored thereon. When executed by one or more processors, the computer program instructs the one or more processors to perform one or more of the steps described herein.

Referring to FIG. 1, a diagram of a wireless communications network 100 in which one or more aspects of the present disclosure may be carried out is depicted. The diagram may illustrate one or more features and an example environment for embodiments of the present disclosure. Wireless communications network 100 is shown as having a number of components and associated devices therein. The wireless communications network 100 includes base stations 102 (shown as 102A and 102B in FIG. 1). Node 102 communicates with one or more UEs 104 (shown as 104A and 104B in FIG. 1) that are disposed within a coverage range of the node 102. The wireless communications network 100 may also include one or more distributed stations 106 that may be partially or fully within the coverage area of the node 102. The base stations 102 and/or distributed stations 106 each projects one or more frequency regions 108 (shown as 108A-C associated with node 102A, 108D-E associated with node 102B, and 108F associated with the distributed station 106 in FIG. 1) that include at least a portion of a band including one or more frequencies that the UE 104 may use to communicate with the node 102.

A trace processor 110 may be communicatively coupled to the base stations 102 and/or distributed stations 106. The trace processor 110 may receive trace reports and other information from the base stations 102 and/or the distributed stations 106 directly or indirectly. In some embodiments, the node 102 and/or distributed stations 106 may send complete trace reports. In other embodiments, the trace report may be independently created by the trace processor 110. A fraud analyzer 112 may receive trace reports or a consolidated information indicative of one or more trace reports from the trace processor 110.

Wireless communications network 100 may be a 5G network, a 4G network, a 6G network, or other telecommunications network. The wireless communications network 100 facilitates communication between the UEs 104 and an external computing device, via the node 102 and/or the distributed stations 106. The wireless communications network 100 may facilitate phone calls, text messages, Internet access, and/or other communications.

The node 102 and/or distributed station 106 may assist the UE 104 in accessing the wireless communications network 100. This connection to the wireless communications network 100 may be described in the ETSI 125-136 series and/or the 3GPP 25/36 series specifications. The node 102 and/or distributed station 106 may assist the UE 104 by providing network-selection assistance data to the UE 104. The network-selection assistance data is indicative of a recommended frequency or frequencies that the node 102 recommends for the UE 104.

The UE 104 may also be referred to as a user device, a cell phone, a smart phone, or the like. The term "user equipment" or "UE" may be described in the Universal Mobile Telecommunications System (UTMS) and/or the 3GPP Long Term Evolution (LTE) as any electronic device utilized directly by an end-user to communicate. Examples include a hand-help smart phone, a traditional cellular phone, a laptop computer equipped with a mobile broadband router (external or internal), a tablet computer with a mobile broadband router, etc. In some embodiments, the UE utilized in certain methods may be a modern 5G-enabled smartphone.

Distributed stations 106 may cover a relatively small geographic area with the distributed frequency region 108F, compared with the frequency regions 108 of the node 102. The distributed station 106 may be unaffiliated with the node 102 and/or may be temporary. The distributed station 106 may also be referred to as an "unplanned cell," a "femtocell", a "pico cell," a "micro cell," a "metro cell," a "small cell," a "fixed relay," or the like. For example, a femtocell may be disposed in a home or business and provide coverage for up to 32 users in a range of up to 100 meters. As another example, a pico cell may be disposed in a large shopping mall or airport and provide coverage for up to 128 users in a range of up to meters. As yet another example, a micro cell may be disposed in a large urban area to fill coverage gaps between base stations 102 and provide coverage for up to 256 users in a range of up to 1000 meters.

Especially with the implementation of 5G, unplanned and irregular placements of access nodes (including the node 102 and the distributed stations 106) may become more common due to the impassability and limited range of the high-frequency signals. For example, the distributed stations 106 may be placed in common public areas such as restaurants and shopping malls to supplement weaker signals from a node 102. This arrangement of base stations 102 and distributed stations 106 may be referred to as a heterogeneous network environment.

Frequency regions 108 are geographic areas covered by at least a portion of a certain frequency band. For example, frequency region 108A may be covered by a first band, frequency region 108B may be covered by a second band, distributed frequency region 108F may be covered by a third band, etc. While in FIG. 1 these frequency regions 108 are shown as ovals, in reality the frequency regions 108 often have an irregular shape due to the terrain, buildings, and other physical features in the geographic location. The frequency regions 108 are also not constant in size and shape and can change due to changing conditions such as weather, interference, and other equipment. Specifically, higher frequency 5G signals are less likely to penetrate solid objects such as walls and trees at least in part because of the nature of high-frequency electromagnetic waves.

An exemplary embodiment of the present disclosure shown in FIG. 1, which will now be discussed. In this example, the trace processor 110 is receiving trace reports from the base station(s) 102 and/or the distributed station(s) 106. Trace reports may then be consolidated and analyzed at the fraud analyzer 112. Based upon this analysis, one or more fraudulent UEs may be determined. The fraud analyzer 112 and/or the trace processor 110 may determine a disabling message, a removal message, a recommendation, a reporting message, or other remedial action. This remedial action will remove or prevent the fraudulent UE from using the network, so as to prevent a scam or other fraudulent activity on the network.

Figure 4:
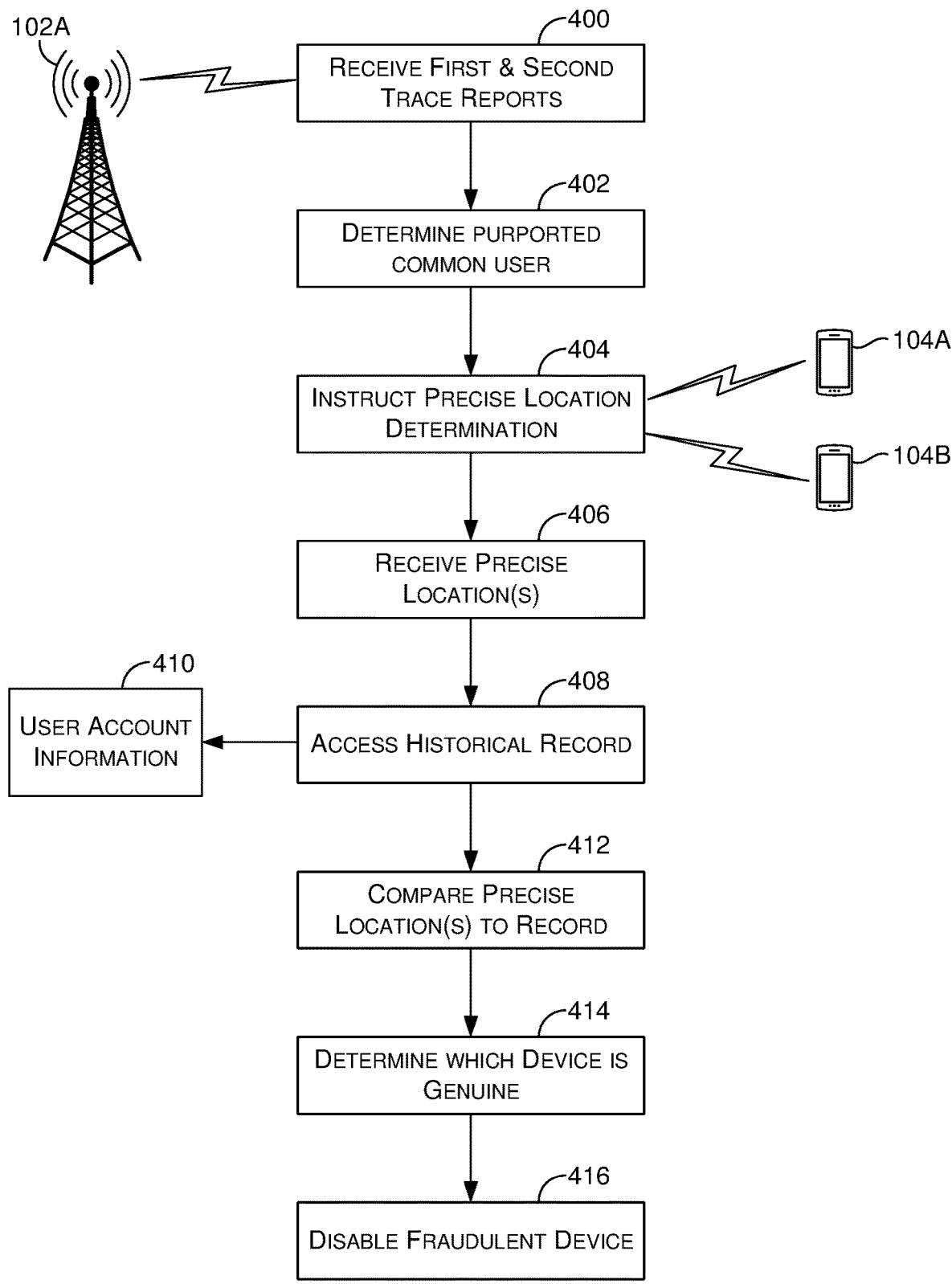
FIG. 4 is a flow diagram of one aspect of a method of identifying fraudulent devices across a wireless communications network.

An example embodiment of aspects herein used in an Open Radio Access Network (RAN) architecture is shown and described. Previous RAN architectures (such as 2G, 3G and 4G; an example of which is shown in FIG. 4) are at least partially monolithic, having few interactions happened between logical nodes. However, the New Radio (NR) may divide the gNB (the NR logical node) between Central Units (CUs) and Distributed Units (DUs) for increased flexibility. Flexible hardware and software implementations allow scalable, cost-effective network deployments—but only if hardware and software components are interoperable and can be mixed and matched from different vendors. A split architecture (between central and distributed units) allows for coordination for performance features, load management, real-time performance optimization and enables adaptation to various use cases and the quality of service (QoS) that needs to be supported (i.e. gaming, voice, video), which have variable latency tolerance and dependency on transport and different deployment scenarios, like rural or urban. Mobile operators may deploy a functional split architecture that openly interfaces between RU, DU and CU in some combination.

The radio unit (RU) at least partially controls the digital front end (DFE) and the parts of the physical (PHY) layer, as well as the digital beamforming functionality. The distributed unit (DU) is in close physical proximity to the RU. The UEs communicated with the DU through the RU. The DU at least partially may control the radio link control (RLC), the medium access layer (MAC), and parts of the PHY layer. This logical node includes a subset of the eNB/gNB functions, depending on the functional split option, and its operation is controlled by the CU. The centralized unit (CU) at least partially controls the Radio Resource Control (RRC) and Packet Data Convergence Control (PDCP) layers. The gNB may consist of a CU and a DU connected to the CU via Fs-C and Fs-U interfaces for CP and UP respectively. A CU with multiple DUs will support multiple gNBs. The split architecture enables a 5G network to utilize different distribution of protocol stacks between CU and DUs depending on midhaul availability and network design. It is a logical node that includes the gNB functions like transfer of user data, mobility control, RAN sharing (MORAN), positioning, session management etc., with the exception of functions that are allocated exclusively to the DU. The CU controls the operation of several DUs over the midhaul interface.

In aspects, the DU sends messages to and receives messages from the UEs. As an example, the DU may send one of the UEs a compute status and/or network status message, indicative of a current status of the DU and/or the Open RAN network generally. The compute capability status message may be sent in response to the compute status message from the DU. As a third example, the UE may send a compute resource report to the DU. The compute resource report may be indicative of processing power and other attributes of the UE regardless of the current capability and/or status.

Returning to FIG. 1, further illustrated are a trace processor 110 and a fraud analyzer 112. In embodiments, the trace processor 110 and the fraud analyzer 112 are core network components that receive trace reports and/or other information from the CU and/or DU. In some embodiments, the trace processor 110 is a DU, the fraud analyzer 112 is a CU, and the node 102 is an RU. In other embodiments, the trace processor 110 is a CU, the fraud analyzer 112 is a core network component, and the node 102 is the RU and the DU. In still other embodiments, other hardware combinations may be used.

The trace processor 110 generates one or more trace reports indicative of one or more UEs that are connected to the node(s) 102 associated with that trace processor 110. In some embodiments. The fraud analyzer 112 receives one or more trace reports from one or more trace processors 110. The trace processor 110 may be a standard part of the network, and may be known as a trace selection entity. In some embodiments, the network may include a single fraud analyzer 112 for the entire network, which receives trace reports from various trace processors 110 spread across the network. As such, the fraud analyzer 112 may consolidate trace reports from numerous different regions of the network so as to identify fraudulent devices that are in a region different than the genuine UE.

Figure 2:
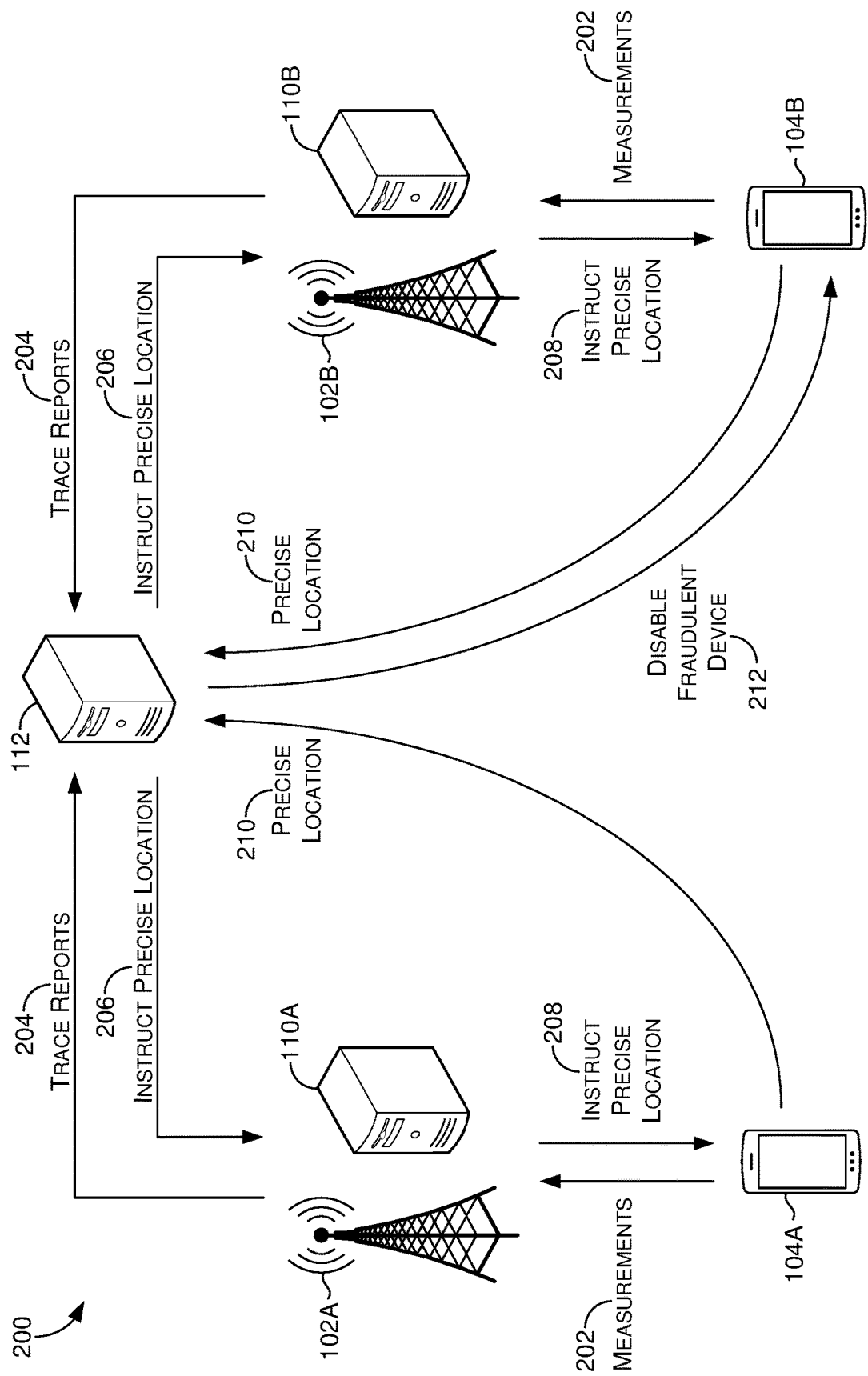
FIG. 2 is a graphical representation of interactions of various components in which one or more aspects of the present disclosure may be carried out.

FIG. 2 depicts an example flow of information, messages, and/or instructions that may be used in some embodiments of the present disclosure, such as a method 200. Generally, FIG. 2 moves from outward to inward. Generally shown is the method 200 of identifying which of two or more UEs are genuine (e.g., correspond to the user to which they purport to).

A set of measurements 202 is sent from the UE 104 to a corresponding node 102. The set of measurements may include a signal strength to the node 102. The set of measurements may also include a signal strength for other nodes 102. These measurements, along with other information, may be compiled by the node into the trace report.

A set of trace reports 204 is sent by node 102 to the trace processor 110. The trace report may include or be otherwise indicative of the set of measurements 202 from one of more UEs 104. A trace is a log entry. A trace report may include one or more traces. The node reports some action by the node and/or a UE connected to the node. For example, the trace report may be indicative that a certain message was received from the UE, the node sent a certain message to the core network to perform some certain process, the node received an indication that the core network had performed the requested process. The node sends the entries to the trace processor. The trace processor may be centralized. Segmented the nation into trace processors for each segment within a market. The trace processors may be located at a data center. The trace processor receives everything from the node in the form of a trace report.

Trace reports may include information from the UE. For example, the UE may report that it is connected to node A, and can contact nodes B, C, and D. The signal strength with connected node is recorded, and may include other measurements. These are measurement reports. The trace processor may determine where the UE is based upon these measurements. This imprecise location determination may be known as triangulation or trilateration. Known locations for the nodes, so based upon the strengths you can estimate the location of the UE. The trace processor will estimate the location based upon the measurements.

A precise location instruction 206 is sent by the fraud analyzer 112 to the trace processor 110 and/or the node 102 based upon two or more trace reports from disparate locations purporting to be associated with a common user. The precise location instruction 206 requests a precise location, such as an MDT location, from the node and/or UE to assist in the determining of which of the one or more UEs 104A, 104B is fraudulent. In embodiments, the trace processor 110 is bypassed and the precise location instruction 206 is sent directly to the node 102 by the fraud analyzer 112.

A precise location instruction 208 is sent by the trace processor 110 and/or the node 102 to the UE. The precise location instruction may direct the UE and/or the node to activate a minimization of drive-testing (MDT) system and provide a precise location from the MDT system. The MDT system may typically measure node performance by comparing signal strength to a specific UE to the precise location of that UE. Embodiments of the present invention use that precise location for another purpose, e.g., identifying fraud. In some embodiments, a similar instruction/message may be sent from the trace processor 110 to the node 102.

A precise location indication 210 is sent by UE 104B to the fraud analyzer 112. The precise location indication 210 provides a more precise and/or more accurate location for the UE to assist in the determination of which of the UEs is fraudulent. The precise location indication 210 may be sent via the node 102 to which the UE 104 is connected.

Figure 3:
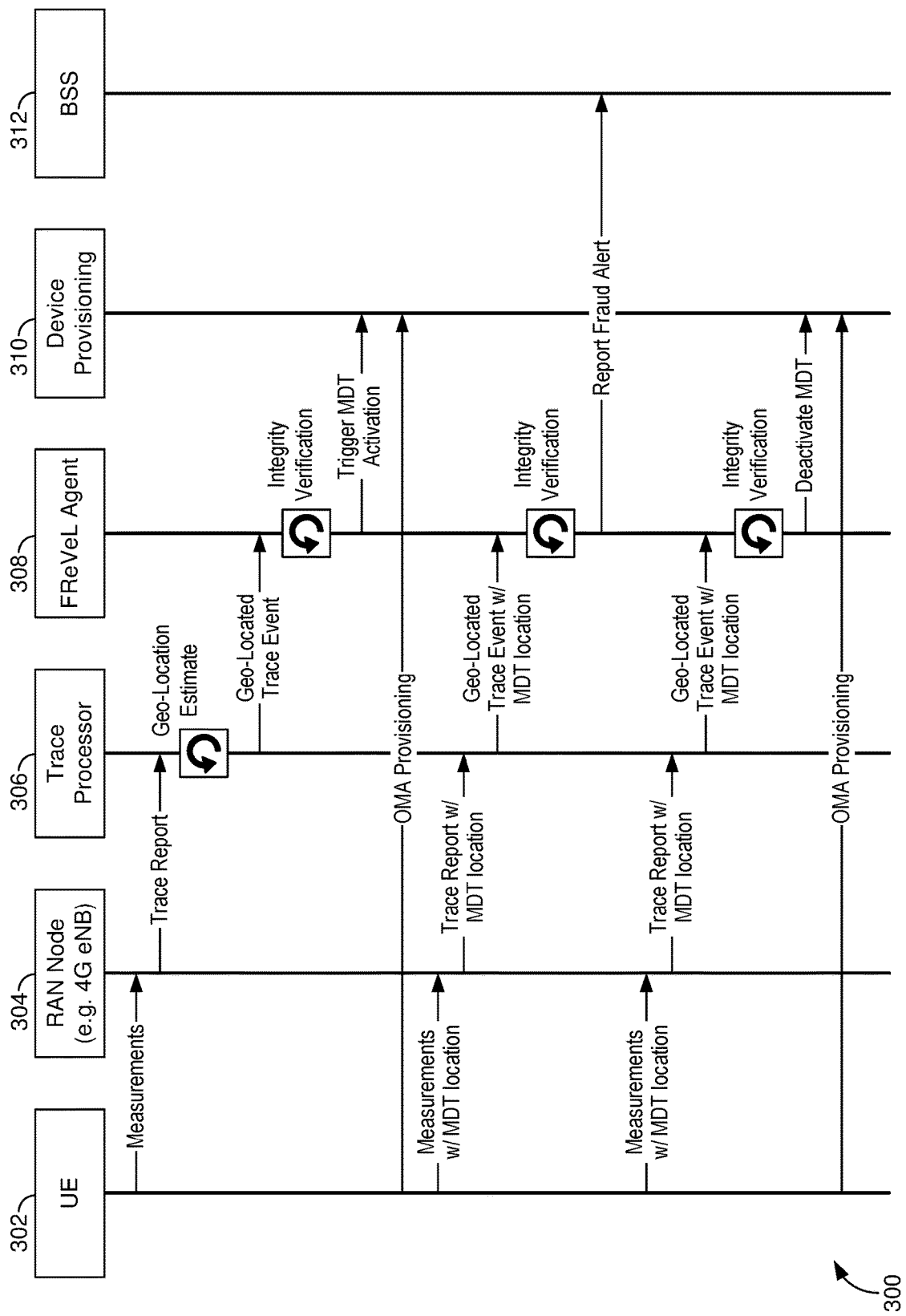
FIG. 3 is a flow diagram of messages that may be sent, in which one or more aspects of the present disclosure may be carried out.

A disabling instruction 212 is sent by fraud analyzer 112 to the UE 104 and/or the node 102. In some embodiments, the disabling instruction 212 may prevent the node 102 from interacting and connecting with the UE. In other embodiments, the disabling instruction 212 may prevent the UE 104 from interacting with the network FIG. 3 depicts a second example flow of information and instructions that may be used in some embodiments of the present disclosure. Generally, FIG. 3 moves from left to right and top to bottom. There are numerous example devices/programs/systems that are shown in FIG. 3. These include a UE 300, a RAN Node 302, a trace processor 304, a trace processor 306, a device provisioner 308, and a business support system 310. It should be appreciated that these example devices/programs/systems may be at least partially hardware and/or at least partially software. It should be also appreciated that one or more may be co-located within the same hardware device or adjacent thereto.

In an example first step, a set of measurements is sent from the UE 300 to the RAN Node 302. The measurements may include any of various data from the UE 300. In an example second step, a trace report is sent from the RAN Node 302 to the trace processor 304. In an example third step, the trace processor analyzes the trace report to determine a geo-location estimate for the one or more UEs 300 indicated on the trace report. This is based upon the nodes that are referenced in the trace report along with corresponding signal strengths.

In an example fourth step, the trace processor 304 sends a geo-located trace event to the trace processor 306. Two or more trace processors 304, which may correspond to different geographic regions or other. In an example fifth step, the trace processor 306 performs an integrity verification. The integrity verification identifies two or more geo-location trace events indicate the same UE and compares the geo-located estimate to determine a likelihood that the two reports are indicative of a single UE (e.g., both are true In an example sixth step, the trace processor 306 sends a trigger MDT message to the device provisioner 308. In an example seventh step, the device provisioner 308 sends an open mobile alliance (OMA) provisioning message to two or more UEs 300 indicative that the UE should determine the precise location.

Following receipt of the OMA provisioning message, two or more nodes/UEs will each perform the MDT steps and determine a precise location for the UE. In some embodiments, all MDT steps may be performed and then the precise location used. In other embodiments, only the MDT steps related to the identification of the precise location may be performed. In an example eighth step, the UE 300 will send measurements with an MDT location (or other precise location) to the RAN Node 302. The MDT location is indicative of a precise location of the UE as determined at least in part by an MDT system of the UE. In an example ninth step, the RAN Node 302 will send a trace report with an MDT location (or other precise location) to the trace processor 304. The trace report, which may be referred to as a precise-location indicative trace report. In an example tenth step, the trace processor 304 will then send a geo-located trace event with the MDT location data to the trace processor 306.

The trace processor 306, having received one or more geo-located trace event with MDT location data, will perform integrity verification in an example eleventh step. In an example thirteenth step, based at least in part upon the integrity verification, the trace processor 306 may send a report fraud alert to any of various business support systems (BSS) or take other remedial action to prevent a fraudulent device from operating on the network. In an example fourteenth step, based at least in part upon the integrity verification, the trace processor 306 may send a deactivate MDT signal to the device provisioner 308 corresponding to one or more UEs that were determined to be genuine. In an example fifteenth step, the device provisioner 308 may send an OMA provisioning message to the one or more UEs determined to be genuine. This OMA message may instruct the UE to deactivate the MDT system, alert the genuine user of the detected fraud, or perform other steps.

FIG. 4 depicts a flow diagram of an exemplary method for detecting fraud across a communications network. Steps of the method may be performed by the UE, by a base station, by a distributed station, or by some combination thereof. The steps may also be performed in any order. Two or more steps may be performed simultaneously.

At step 400, a processor (such as in the administrative user device 110) receives one or more trace reports, such as a first trace report and a second trace report. The administrative user device 110 may include monitoring and/or receiving information related to a mobile communications network, such as wireless communications network 100 of FIG. 1. Information related to the various UEs connected, connection speeds, connection drops on the node 102 may be sent to the administrative user device (or may be directly monitored by the administrative user device).

At Step 402, the processor identifies a purported common user. A purported common user is indicative that two or more UEs on the network purport to be associated with a single user. In many of these instances, one or more of the purported common users is fraudulent. In some embodiments, the processor receives a common user report from an external computing device, such as the node 102. In other embodiments, the processor generates the common user report.

In embodiments, a common user report is an alarm that communicates the identification of the UE(s), node(s), or other hardware in which purported commonality were detected. The normal rate may be determined by measuring the message throughput during that time period. In one aspect, the purported common users may not be on the network at the simultaneously, but may be separated by a time period that would require a single true UE to have traveled faster than would have been otherwise possible or likely. For example, a first UE detected on a first node at a time $T_0$ and a second UE detected on a second node at a time $T_1$, where $T_0$ is the beginning of the time period and $T_1$ is the end of the time period. The distance from the first node to the second node being greater than could be expected to travel in that time period.

At Step 404, the processor instructs the one or more purported common UEs to determine a precise location. In some embodiments, the precise location uses a minimization of drive testing (MDT) system of the UE. The MDT system was introduced with 3GPP release 10. MDT provides a way for network operators to test their network performance without having to perform the traditional drive test, which included driving around with a UE to test the signal strength. MDT allows the operator of the network to determine network performance remotely. MDT provides precise positional information based upon GPS, signal strengths, and other information. The MDT system thus provides a precise location in a way that the network is already configured to receive and interpret. Embodiments of the invention thus use the MDT system for fraud detection.

At Step 406, the processor receives a precise location for one or more of the purported common user UEs. In lieu of the precise location, the processor may receive an indication that the precise location could not be or was not returned. The precise location may be an output of or otherwise associated with the MDT system.

In Step 408, the processor may access a historical record. This step may include accessing a set of user account information in Step 410. The historical record and/or the set of user account information may include the identification of historical location information or other key terms that may correspond to one or more of the purported common user UEs. The historical location information may include one or more locations in which the UE was previously identified to be. The historical location information may include a network-based location and/or a precise location for that UE. Key terms may be related to physical characteristics of the UE, software characteristics of the UE, characteristics of one or more nodes connected to the UE (e.g., for which nodes the historical UE was connected), protocols being used, additional problems identified (e.g., a history of the UE being emulated), and other information related to the hardware and/or software being used. The key terms are identified from the historical information such as by a natural language processing, machine learning, algorithmic, or other methods. The processor may determine terms that have been identified as key terms in prior incidents. The processor may additionally or alternatively may context-specific determinations regarding the key terms.

At Step 412, the processor compares the current precise location information to the historical location information and/or key terms. In this step, the processor may determine commonalities and differences between the current UEs and the historical UEs. If one of the UEs shares commonalities with the historical UE, it is more likely to be the genuine UE.

At Step 414, the processor determines a which, if any, of the purported common user UEs is genuine and/or which of the purported common user UEs is fraudulent. The processor analyses those prior incidents that were identified as analogous in Step 406 to determine what, if any, remedial action was taken as well as what, if any, resolution was observed following that remedial action. If the processor identifies favorable resolutions, the processor may identify the remedial action taken as likely to produce a similarly favorable resolution. If the processor identifies non-favorable resolutions, the processor may identify the remedial action taken as unlikely to produce a favorable resolution. If the processor identifies a delayed remedial action, the processor may analyzes the performance during the delay to determine whether a delayed remedial action may be appropriate (based upon other factors, such as a current time of day, UE load, and the The determination may be expressed as an indication of a likelihood that the particular UE is either genuine or fraudulent. The processor may produce a snapshot or summary of the analyses and calculations performed by the system in determining whether the UE is fraudulent. For example, a network (or the administrator thereof) may dictate by rule or regulation a minimum acceptable confidence in fraudulence before disconnecting a UE. In some instances the minimum acceptable confidence may be based upon the type of UE, the type of node, the time of day, etc.

The confidence can be expressed in any of several forms. A first exemplary form is a numerical value. The numerical value could be expressed from −100 to +100, such that −100 is definitely fraudulent and +100 is definitely genuine (intermediate values being in the range of −99 to 0 and 0 to +99). In other embodiments, the numerical value could be expressed a likelihood from 0-10, such that 0 is definitely fraudulent and 10 is definitely genuine (intermediate values ranging from 0.1 to 9.9 or 1 to 9). In yet other embodiments, the numerical value is a summation of factors with no theoretical maximum or theoretical minimum. A second exemplary form is a letter grade, such as an "F" for definitely fraudulent and an "A" for definitely genuine (intermediate values being "B," "C," and "D"—possibly including plusses and minuses). A third exemplary form may be a color system in which red is definitely fraudulent and green is definitely genuine (intermediate values being on the color spectrum between red and green). A fourth exemplary form may be a simple pass/fail designation. The pass/fail designation definitely states whether the system believes the UE to be fraudulent or not. In this and other forms, the system may presume that the UE is fraudulent until the UE proves it to be genuine through precise location verification. Another example of the pass/fail designation could be "proven to be genuine," "not proven to be genuine," and "proven to be fraudulent." A fifth exemplary form, which may be utilized in addition to one of the above-mentioned forms, may be a user fraud profile. The user fraud profile is a set of information regarding the likelihood of fraud or genuineness based upon the categories discussed herein. The user fraud profile may be associated with a user account.

At Step 416, the processor instructs and/or performs a disabling of the one or more UEs identified as fraudulent, and/or performs some other remedial action. In some embodiments, the processor sends a message to the node instructing the disabling or other remedial action. In other embodiments, the processor directly performs the disabling or other remedial action.

In some embodiments, the processor instructs and/or performs the reset automatically and provides the recommendation to the administrative user device as a summary of the remedial action performed and the reasons thereof. In these embodiments, the remedial action may be taken without any human interaction.

In embodiments, one or more of the above-discussed steps may be performed by the user device. In other embodiments, one or more of the above-discussed steps may be performed by the base station and one or more of the above-discussed steps may be performed by the user device. In still other embodiments, one or more of the above-mentioned steps may be performed by the distributed station. In yet still other embodiments, one or more of the above-discussed steps may be performed by the distributed station and one or more of the above-discussed steps may be performed by the user device.

Figure 5:
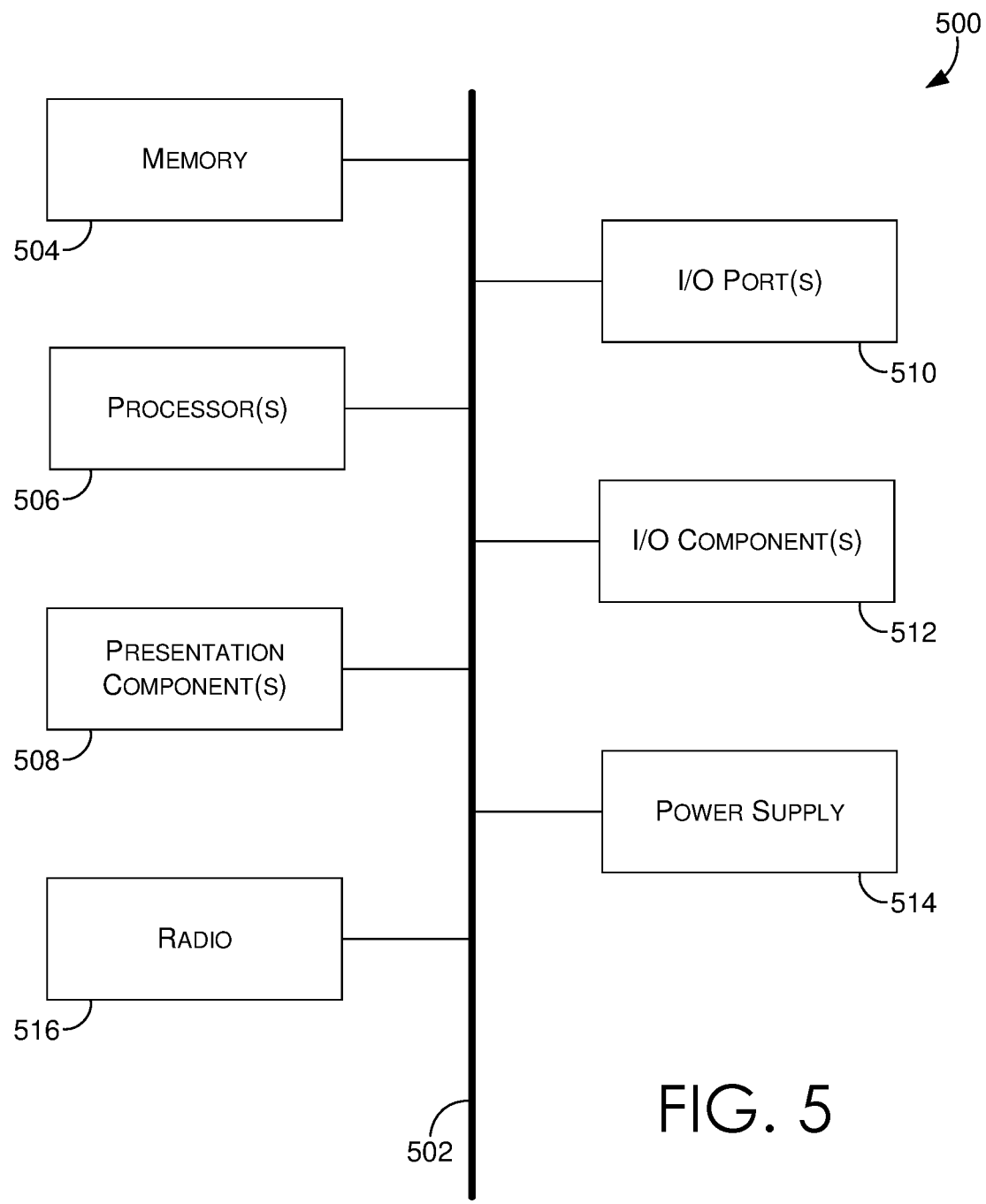
FIG. 5 is a diagram of a computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of aspects described herein. Neither should computing device 500 be interpreted as having any dependency or requirement relating to any one or combination of components illustrated. In aspects, the computing device 500 may be a UE 104, WCD, or other user device, capable of two-way wireless communications with an access point. Some non-limiting examples of the computing device 500 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory.

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. In aspects, the radio 516 utilizes one or more transmitters, receivers, and antennas to communicate with the wireless telecommunications network on a first downlink/uplink channel. Though only one radio is depicted in FIG. 1, it is expressly conceived that the computing device 500 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects herein. Components such as a node 102, a communications tower, or even access points (as well as other components) can provide wireless connectivity in some embodiments.

Figure 6:
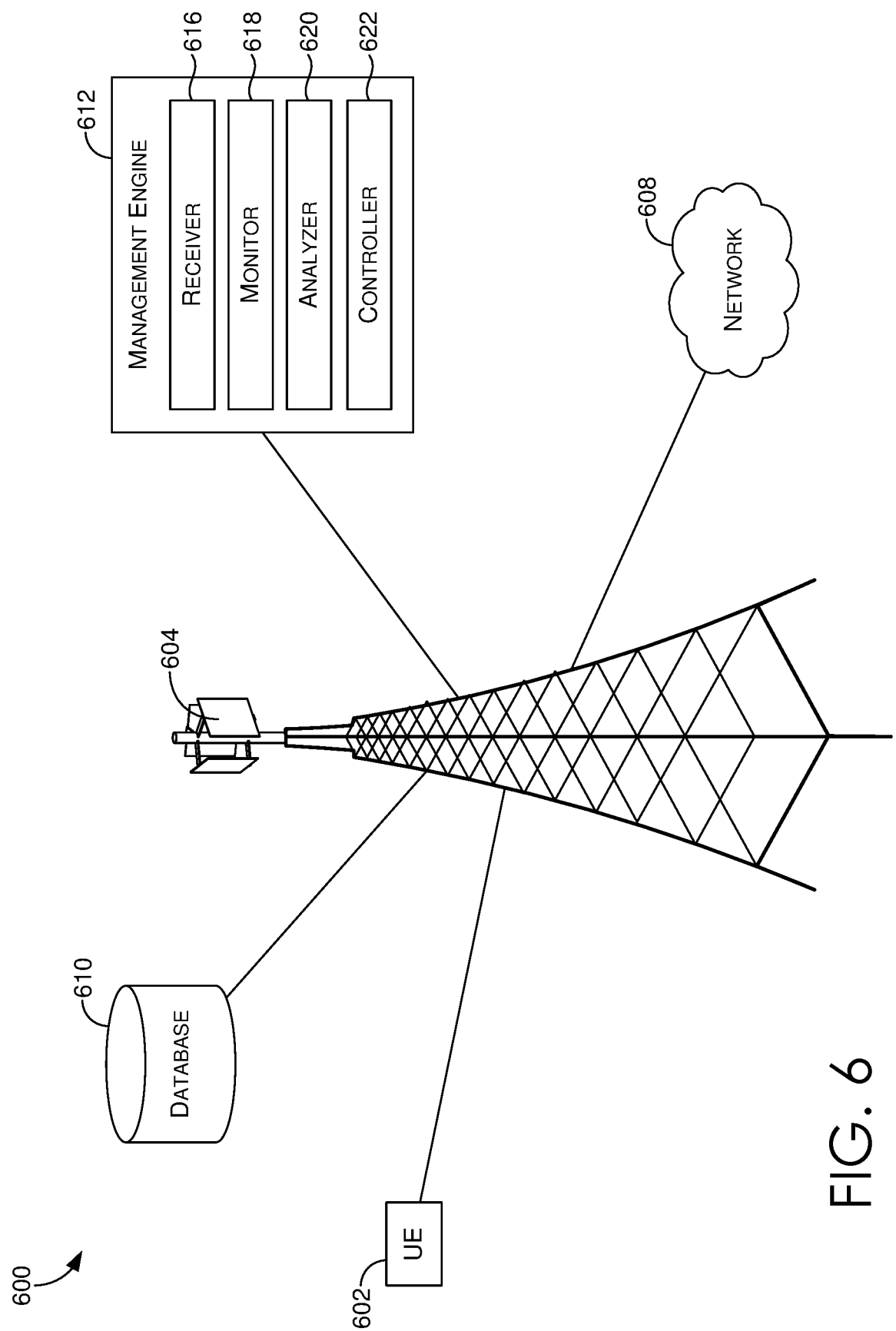
FIG. 6 illustrates a network environment in which implementations of the present disclosure may be employed.

FIG. 6 provides an exemplary network environment in which implementations of the present disclosure may be employed. Such a network environment is illustrated and designated generally as network environment 600. Network environment 600 is but one example of a suitable network environment and is not intended to suggest any limitation as to the scope of use or functionality of aspects. Neither should the network environment be interpreted as having any dependency or requirement relating to any one or combination of components illustrated.

Network environment 600 includes user device 602, a first node 604, network 608, database 610, and trace engine 612. In network environment 600, the user device 602 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that wirelessly communicates via with a node of the wireless network, such as the first node 604, in order to interact with one or more components of the network 608.

In some aspects, the user device 602 can correspond to computing device 500 in FIG. 1. Thus, a user device can include, for example, a display(s), a power source(s) (e.g., a battery), a data store(s), a speaker(s), memory, a buffer(s), a radio(s) and the like. In some implementations, the user device 602 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 602 may communicate with the node 604 on any one or more frequencies, frequency bands, channels, or the like. Though only the node 604 is depicted in FIG. 2, it should be understood that the user device 602 may be capable of connecting to any one or more of a plurality of nodes, using any one or more of a plurality of communication protocols, on any one or more of a plurality of frequencies.

In some cases, the user device 602 in network environment 600 can optionally utilize network 608 to communicate with other computing devices (e.g., a mobile device(s), a server(s), a personal computer(s), etc.) through the node 604. The network 608 may be a telecommunications network(s), or a portion thereof. A telecommunications network might include an array of devices or components (e.g., one or more base stations 102), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 608 can include multiple networks, as well as being a network of networks, but is shown in more simple form so as to not obscure other aspects of the present disclosure.

Network 608 can be part of a telecommunication network that connects subscribers to their immediate service provider. In some instances, network 608 can be associated with a telecommunications provider that provides services (e.g., voice, data, SMS) to user devices, such as user device 602. For example, network 608 may provide voice, SMS, and/or data services to user devices or corresponding users that are registered or subscribed to utilize the services provided by a telecommunications provider. Network 608 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the first node 604 is configured to communicate with user devices, such as the user device 602 that are located within the geographical area, or cell, covered by the one or more antennas of the first node 604. Though referred to as a node for simplicity, the first node 604 may include (or be communicatively coupled to) one or more base stations 102, distributed stations, nodes, base transmitter stations, radios, antennas, antenna arrays, power amplifiers, transmitters/receivers, digital signal processors, control electronics, GPS equipment, and the like. In particular, the node 604 may transmit a downlink signal to the user device 602 in an effort to establish a wireless communication session. The user device 602 may perform a cell selection/reselection procedure wherein the user device 602 makes various determinations, measurements, and/or observations about one or more network parameters. If the user device 602 selects (or reselects) the cell comprising node 604, the user device 602 may, in return, attempt to communicate an uplink signal back to the node 604.

The first node 604 may be in communication with the trace engine 612, which comprises various components that are utilized, in various implementations, to perform one or more methods as described herein. In some implementations, such as the one depicted in FIG. 6, the trace engine 612 comprises components including a receiver 616, a monitor 618, a logging engine 620, and a controller 622. However, in other implementations, more or less components than those shown in FIG. 6 may be utilized to carry out aspects described herein. Though shown as a separate entity, the trace engine 612 may take the form of one or more software stacks, modules, applications, etc., may be executed and/or located at a single location or a plurality of locations, and may executed by one or more network components, or may provide instructions for execution at a location remote to the trace engine.

The receiver 616 of the trace engine 612 is generally responsible for receiving information, measurements, and/or indications from various network components and/or user devices that may be relevant for the trace reports. For example, the receiver 616 may receive a plurality of RF signals in the uplink. Said received RF signals may comprise external interference, inter-modulation interference, inter-nodal interference, thermal noise, jamming RF, uplink transmissions from a user device, or the like. The receiver 616 may communicate said information to one or more of the monitor 618, the logging engine 620, or the controller 622. The monitor 618 of the trace engine 612 is generally responsible for monitoring signal strength, transfer speeds, call connections, and other aspects of the received RF signals in the uplink and one or more network parameters of the wireless communication links between the node 604 and the user device 602. The one or more network parameters may comprise a frequency, channel, frequency band, wireless communication protocol, selected cell, or the like. The monitor 618 may communicate said information to one or more of the logging engine 620 and the controller 622.

The logging engine 620 may receive an indication from the receiver 616 and/or the monitor 618 as to the current information related to current operations of the node and/or the UEs connected to the node, which may include signal strengths, actions taken, transfer speeds, call drops, packet loss, and other analytics. The logging engine 620 may generate record one or more logs, which may include a trace report. The receiver 616 may receive instruction to perform the remedial action such as disabling/disconnecting one or more UEs connected to the node. The controller 622 may implement or otherwise cause the remedial action, such that the remedial action (such as a disconnection) is performed. Thus, the efficiency of the overall system may be increased by remotely receiving and executing the disconnect instructions.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A computerized method comprising:
    receiving a first trace report corresponding to a first user equipment and a first node;
    receiving a second trace report corresponding to a second user equipment and a second node, wherein both the first user equipment and the second user equipment are associated with a common user;
instructing each of the first user equipment and the second user equipment to identify their precise location;
receiving a first precise location associated with the first user equipment and a second precise location associated with the second user equipment;
accessing a historical record of the common user;
comparing the first precise location and the second precise location to the historical record;
determining, based upon the comparison, that the first user equipment is fraudulent; and
instructing a remedial action related to at least one of the first node or the first user equipment.

2. The computerized method of claim 1, further comprising:
instructing activation of a minimization of drive-testing system,
wherein the first precise location is associated with the minimization of drive-testing system of the first node.

3. The computerized method of claim 1,
wherein the remedial action includes instructing disconnection of the first user equipment from the first node.

4. The computerized method of claim 1,
wherein the first trace report includes a signal strength for the first node as measured by the first user equipment,
wherein the second trace report includes a second signal strength for the second node as measured by the second user equipment.

5. The computerized method of claim 1,
wherein the first trace report was generated by a first trace processor,
wherein the second trace report was generated by a second trace processor,
wherein the first trace processor is distinct from the second trace processor.

6. The computerized method of claim 5,
wherein the first trace processor is in a distinct geographic region from the second trace processor,
wherein fraud is at least partially indicated based at least in part on the distinct geographic region.

7. The computerized method of claim 6,
wherein the first trace report includes a first imprecise location for the first user equipment that was determined by the first trace processor,
wherein the second trace report includes a second imprecise location for the second user equipment that was determined by the second trace processor,
wherein the step of instructing to identify their precise location is based at least in part on a distance between the first imprecise location and the second imprecise location.

8. A system comprising:
a processor; and
one or more computer storage hardware devices storing computer-usable instructions that, when used by the processor, cause the processor to:
receive a first trace report corresponding to a first user equipment and a first node;
receive a second trace report corresponding to a second user equipment and a second node,
wherein both the first user equipment and the second user equipment are associated with a common user;
instruct each of the first user equipment and the second user equipment to identify their precise location;
receive a first precise location associated with the first user equipment and a second precise location associated with the second user equipment;
access a historical record of the common user;
compare the first precise location and the second precise location to the historical record;
determine, based upon the comparison, that the first user equipment is fraudulent; and
instruct a remedial action related to at least one of the first node or the first user equipment.

9. The system of claim 8, wherein the computer-usable instructions further cause the processor to:
instruct activation of a minimization of drive-testing system,
wherein the first precise location is associated with the minimization of drive-testing system of the first node.

10. The system of claim 8,
wherein the remedial action includes instructing disconnection of the first user equipment from the first node.

11. The system of claim 8,
wherein the first trace report includes a signal strength for the first node as measured by the first user equipment,
wherein the second trace report includes a second signal strength for the second node as measured by the second user equipment.

12. The system of claim 8,
wherein the first trace report was generated by a first trace processor,
wherein the second trace report was generated by a second trace processor,
wherein the first trace processor is distinct from the second trace processor.

13. The system of claim 12,
wherein first trace processor is in a distinct geographic region from the second trace processor,
wherein fraud is at least partially indicated based at least in part on the distinct geographic region.

14. The system of claim 12,
wherein the first trace report includes a first imprecise location for the first user equipment that was determined by the first trace processor,
wherein the second trace report includes a second imprecise location for the second user equipment that was determined by the second trace processor,
wherein the step of instructing to identify their precise location is based at least in part on a distance between the first imprecise location and the second imprecise location.

15. A system comprising:
a trace processor configured to:
receive a trace report from a first node indicative of a first user equipment;
geo-locate the first user equipment based at least in part on the trace report; and
generate a first geo-located trace report; and
a fraud analyzer configured to:
receive, from the trace processor, the geo-located trace report corresponding to the first user equipment;
receive a second geo-located trace report corresponding to a second user equipment,
wherein both the first user equipment and the second user equipment are associated with a common user;
instruct each of the first user equipment and the second user equipment identify their precise location;
receive a first precise location associated with the first user equipment and a second precise location associated with the second user equipment;

access a historical record of the common user;
compare the first precise location and the second precise location to the historical record;
determine, based upon the comparison, that the first user equipment is fraudulent; and
instruct a remedial action related to at least one of the first node or the first user equipment.

16. The system of claim 15, wherein the fraud analyzer is further configured to:
instruct activation of a minimization of drive-testing system,
wherein the first precise location is associated with the minimization of drive-testing system of the first node.

17. The system of claim 15,
wherein the remedial action includes instructing disconnection of the first user equipment from the first node.

18. The system of claim 15,
wherein the trace report includes a signal strength for the first node as measured by the first user equipment,
wherein the trace processor geo-locates the first user equipment based at least in part on the signal strength.

19. The system of claim 15,
wherein the trace processor is a first trace processor,
wherein the second geo-located trace report is received from a second trace processor distinct from the first trace processor.

20. The system of claim 19,
wherein the first trace processor is in a distinct geographic region from the second trace processor,
wherein the first trace report includes a first imprecise location for the first user equipment that was determined by the first trace processor,
wherein the second trace report includes a second imprecise location for the second user equipment that was determined by the second trace processor,
wherein the step of instructing to identify their precise location is based at least in part on a distance between the first imprecise location and the second imprecise location.

\* \* \* \* \*